United States Patent [19]

Nakai et al.

[11] 3,903,452

[45] Sept. 2, 1975

[54] FLICKERLESS DISCHARGE LAMP LIGHTING APPARATUS

[75] Inventors: Kenichi Nakai, Neyagawa; Hiroshi Nishimura, Kyoto, both of Japan

[73] Assignee: Matsushita Electric Works, Ltd., Osaka, Japan

[22] Filed: Apr. 11, 1974

[21] Appl. No.: 460,020

[30] Foreign Application Priority Data

| Apr. 13, 1973 | Japan | 48-42355 |
| Apr. 13, 1973 | Japan | 48-423556 |
| May 15, 1973 | Japan | 48-54313 |

[52] U.S. Cl. ............ 315/201; 315/DIG. 5; 315/161; 315/205; 315/227; 315/246; 315/276; 315/362
[51] Int. Cl.² ................... H05B 37/00; H05B 41/16
[58] Field of Search ...... 315/DIG. 5, 160, 161, 173, 315/174, 191, 192, 193, 195, 185 R, 187, 201, 205, 210, 227, 246, 247, 257, 276, 313, 362

[56] References Cited
UNITED STATES PATENTS

| 2,712,618 | 7/1955 | Feinberg | 315/247 X |
| 3,061,759 | 10/1962 | Spector | 315/257 |

*Primary Examiner*—R. V. Rolinec
*Assistant Examiner*—Lawrence J. Dahl
*Attorney, Agent, or Firm*—Wolfe, Hubbard, Leydig, Voit & Osann, Ltd.

[57] ABSTRACT

A flickerless discharge lamp lighting apparatus for at least two discharge lamps having first and second discharge lamp circuits connected respectively a first AC source capable of starting the discharge lamp and a second AC source capable of maintaining constant lighting of the lamp. A switching element is inserted between the second discharge lamp circuit and the second AC source, and a voltage transmitting impedance is inserted between the first AC source and the second discharge lamp circuit, so that the first discharge lamp circuit will be advanced in phase and the second discharge lamp circuit will be delayed in phase to provide flickerless operation.

7 Claims, 6 Drawing Figures

FLICKERLESS DISCHARGE LAMP LIGHTING APPARATUS

This invention relates to flickerless discharge lamp lighting apparatus.

In an exemplary conventional flickerless discharge lamp lighting apparatus as shown in FIG. 1, an alternating current source 1 is connected to the primary side of a current source transformer 2, and discharge lamps 3 and 4 are connected to the secondary side of the current source transformer 2 through stabilizers 5 and 6 respectively. The stabilizer 5 includes only an inductor. The stabilizer 6 is arranged to be an advancing impedance by including a series corrected inductor and capacitor. Therefore, the circuit including the discharge lamp 4 will be advanced in phase and the circuit including the discharge lamp 3 will be delayed in phase to attain flickerless lighting. However, in such conventional flickerless discharge lamp lighting apparatus, the current source transformer 2 must not only produce a secondary side voltage $V_2$ of sufficient level to start the discharge lamps 3 and 4 but must also be capable of passing the entire current drawn by the discharge lamps 3 and 4. Further, after the discharge lamps 3 and 4 are started and shift to constant lighting, the voltage $V_2$ will exceed the constant lighting maintaining voltage and, therefore, the excess will have to be borne by the stabilizers 5 and 6. Therefore, in lighting apparatus of this type the stabilizers 5 and 6 have been large, the entire lighting apparatus has been large and its weight and cost have been high.

The present invention is suggested to overcome the above mentioned shortcomings.

A main object of the present invention is to provide a flickerless discharge lamp lighting apparatus which is small in size, light in weight and low in cost.

Another object of the present invention is to provide a flickerless discharge lamp lighting apparatus of the high power factor type.

Other objects and advantages of the present invention will become clear upon reading the following disclosure of the invention detailed with reference to preferred embodiments shown in accompanying drawings, in which.

Figure 1:
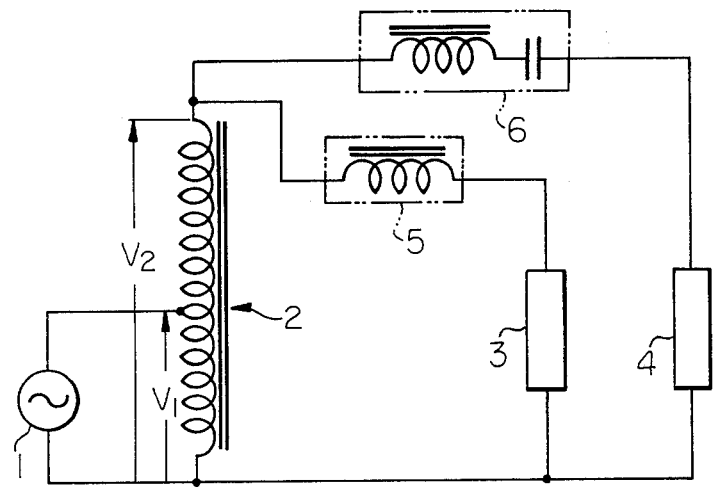
FIG. 1 shows a circuit diagram of a conventional flickerless discharge lamp lighting apparatus.
Figure 2:
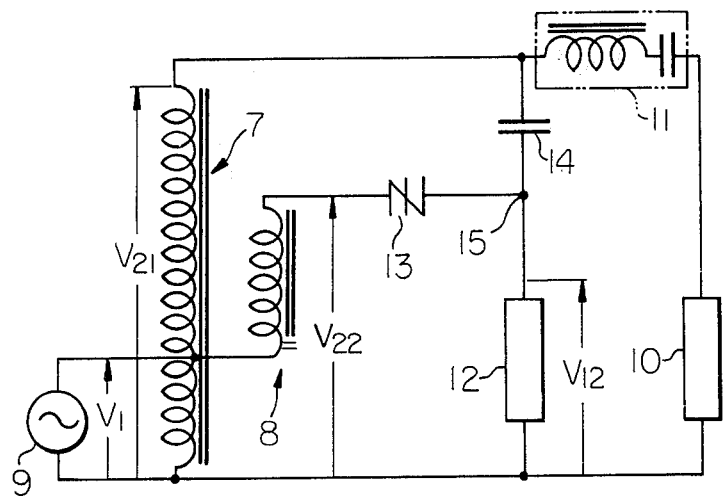
FIG. 2 shows a circuit diagram of an embodiment of the flickerless discharge lamp lighting apparatus according to the present invention.

In FIG. 2, showing an embodiment of the flickerless discharge lamp lighting apparatus of the present invention, an alternating current source 9 is connected to the primary sides of a single winding transformer 7 and a single winding leakage transformer 8, the transformers 7 and 8 forming first and second alternating current sources for the discharge lamp circuits. A discharge lamp 10 is connected to the high voltage side of the transformer 7 through a stabilizer 11, and a second discharge lamp 12 is connected to the leakage transformer 8 through an SSS (silicon symmetrical switch) 13. A condenser 14, forming an impedance for transmitting the voltage for starting the discharge lamp 12, has one terminal coupled to the junction between the discharge lamp 12 and SSS 13 and a second terminal coupled to the high voltage side of the transformer 7. The secondary side voltage $V_{21}$ of the transformer 7 is so set as to be of a magnitude capable of starting the discharge lamps 10 and 12. The secondary side voltage $V_{22}$ of the leakage transformer 8 is so set as to be of a magnitude capable of maintaining the constant lighting of the discharge lamp 12. In this arrangement, the SSS 13 is selected to have a breakover voltage greater than the voltage $V_{21} - V_{22}$ and less than the voltage $V_{22}$ taken at the moment when the current of the discharge lamp 12 is about to reverse.

Now the operation of the circuit shown in FIG. 2 shall be explained. When the current source 9 is switched on, the discharge lamp 10 will start and will shift to the normal lighting. As only a low voltage represented by the difference between the voltages $V_{22}$ and $V_{21}$ is applied to the SSS 13, the SSS 13 will be in the non-conducting state. However the discharge lamp 12 will be started by the voltage $V_{21}$, and a minute current will flow through the discharge lamp 12 and the condenser 14. As a result of the minute discharge of the discharge lamp 12, both ends of the SSS 13 will be potentially connected with both ends of the leakage transformer 8. Accordingly the voltage $V_{22}$, larger than the breakover voltage of the SSS 13, will be applied through the discharge lamp 12, and the SSS 13 will turn ON. During the next half cycle of the voltage $V_{22}$, when the current flowing through the SSS 13 is about to reverse, the SSS will be turned OFF but, as the breakover voltage $V_{BO}$ of the SSS 13 is selected to be below the momentary value of the voltage $V_{22}$, the SSS will again be switched ON. Thus, the discharge lamp 12 will shift to constant lighting due to the voltage $V_{22}$.

Figure 3:
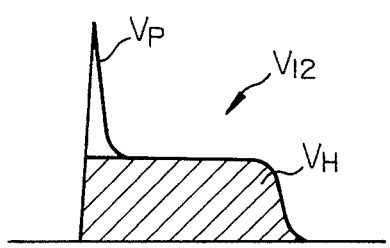
FIG. 3 is an explanatory diagram for showing the relation between the current source voltage and the load current in the present invention.
Figure 4:
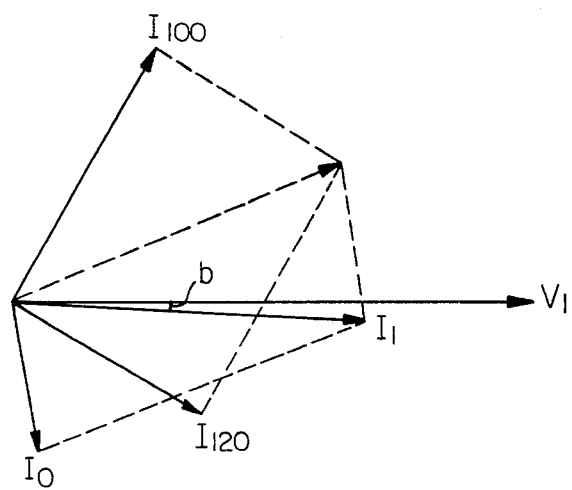
FIG. 4 is a vector diagram showing the relation between the input current and the source voltage in the present invention.

Thus, as the no-load secondary circuit can be constructed to operate at a comparatively low voltage level sufficient to maintain the constant lighting of the discharge lamp 12, the number of secondary windings of the leakage transformer 8 can be reduced, and the apparatus made small in size, light in weight and low in cost. In the present instance, the comparatively low voltage $V_{22}$ is so selected as to be of a level sufficient to maintain the constant lighting of the discharge lamp 12. When it is selected to be as low as possible in the range providing at least the discharge maintaining voltage $V_H$, as shown by the hatching of the lighting tube voltage $V_{12}$ of the discharge lamp 12 shown in FIG. 3, the apparatus will be reduced in size achieving the aforementioned advantages. But, if the voltage $V_{22}$ is made too low, the lighting stability of the discharge lamp 12 will be reduced to the extent that the lamp will be likely to go out with the slightest fluctuation of the current source voltage or reduction of the surrounding temperature. Therefore, in practice, in order to attain the expected objects and to eliminate such disadvantages, it is preferable to select the voltage $V_{22}$ to be slightly greater than the reigniting voltage $V_p$ which has a magnitude necessary to reignite the discharge lamp 12 and which is shown in FIG. 3 in the first part of the lighting tube voltage $V_{12}$ so that, after the starting of the discharge lamp 12, there may be no influence by the comparatively high voltage. Further, tube currents $I_{10}$ and $I_{12}$ of advanced phase and delayed phase and of the same magnitude will be fed to the discharge lamps 10 and 12 to flickerlessly light them. Now, as the voltage $V_{22}$ is set to be smaller than the voltage $V_{21}$, the delayed current $I_{120}$ flowing on the current source side due to the tube current $I_{12}$ of delayed phase flowing through the discharge lamp 12 will be smaller than the advanced current $I_{100}$ flowing on the current source side due to the tube current $I_{10}$ of advanced phase flowing through the discharge lamp 10. Therefore, as shown in the FIG. 4, the current represented by the resultant of the advanced current $I_{120}$ and delayed current $I_{100}$ will be of an advanced phase. As a result, the phase of the input current $I_1$, which is the vector sum of that resultant current with the exciting current $I_0$ of the leakage transformer, will be of substantially the same phase as of the current source voltage $V_1$, and a flickerless discharge lamp lighting apparatus high in input power factor will be realized. This relation is shown in FIG. 4, in which it is well understood that the angle $b$ formed by the input current $I_1$ and current source voltage $V_1$ is so small that the input power factor is high.

Figure 5:
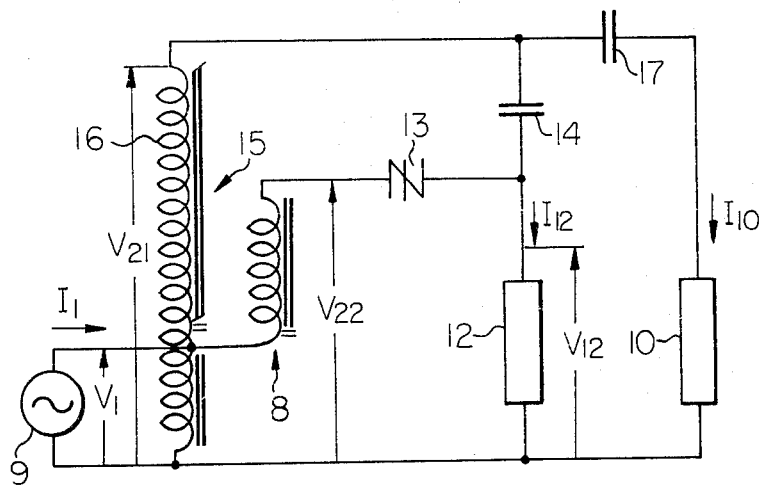
FIG. 5 and 6 are circuit diagrams showing other embodiments of the present invention.

FIG. 5 shows another embodiment of the present invention. The embodiment illustrated in FIG. 5 differs from that shown in FIG. 2 in that a saturated type iron core (bridge gap iron core) is used in the secondary winding part 16 of a transformer 15, a so-called lead peak type leakage transformer is used and a condenser 17 for advancing the phase is used as a stabilizer for the discharge lamp 10.

The operation of the circuit in FIG. 5 shall be explained in the following. When the curent source 9 is switched ON, the voltage $V_{21}$ of a lead peak type having a voltage peak value which can start the discharge lamps 10 and 12 will be induced in the transformer 15. In response to voltage $V_{21}$, the discharge lamp 10 will start and will shift to constant lighting. However, as only the very low voltage $V_{21} - V_{22}$ will be applied to the SSS 13, it will remain OFF. Even if the discharge lamp 10 starts to discharge, the peak value of the voltage $V_{21}$ will not be reduced since the circuit is a phase advancing circuit. Therefore, the voltage $V_{21}$ having a high peak value will be coupled to the discharge lamp 12 through the condenser 14 and the discharge lamp 12 will start the discharge of a minute current. By this minute current discharge, both ends of the SSS 13 will be potentially connected with both ends of the leakage transformer 8. When the voltage $V_{22}$ exceeds the breakover voltage of the SSS 13, the SSS 13 will be ON and the discharge lamp 12 will shift to constant lighting due to the voltage $V_{22}$.

Thus, as the no load secondary voltage $V_{22}$ of the phase delaying circuit can be set at a comparatively low voltage level sufficient to maintain the constant lighting of the discharge lamp 12, the number of secondary winding turns of the leakage transformer 8 can be reduced, and at the same time, the effective value of the no-load secondary voltage of the phase advancing circuit can be also reduced. Therefore, the electric power capacity of the leakage transformer 15 can be reduced, the working voltage of the condenser 17 can be also reduced and the entire apparatus can be made smaller in size, lighter in weight and lower in cost.

Figure 6:
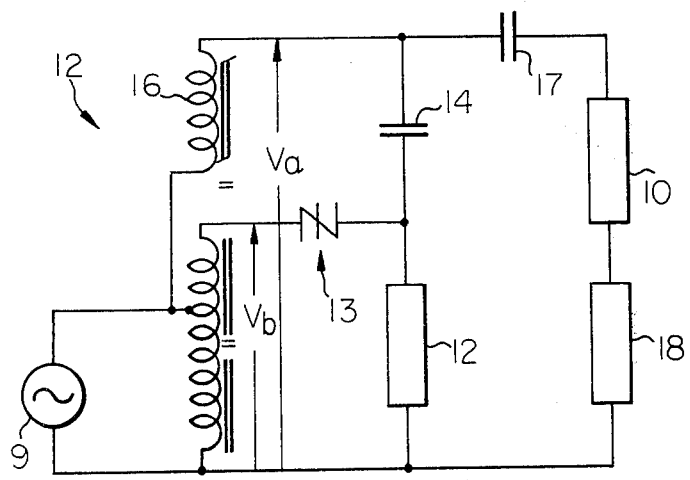

FIG. 6 shows another embodiment of the present invention, in which the most significant difference from the embodiment of FIG. 5 is that a discharge lamp 18 is connected in series with the discharge lamp 10. The operation of this embodiment is the same as in that of FIG. 5.

If the present invention is applied, for example, to a 40w 2-lamp flickerless type fluorescent lamp stabilizer, it will be possible to produce a rapid type flickerless stabilizer with the same dimensions as of the conventional 40w 2-lamp series rapid type stabilizer.

What is claimed is:

1. A flickerless discharge lamp lighting apparatus for three discharge lamps comprising a first AC source for producing a high voltage capable of starting two of the discharge lamps in series, a second AC source for producing a voltage capable of maintaining the constant lighting of one of the discharge lamps, a first discharge lamp circuit including two of the discharge lamps coupled in series to said first AC source, a second discharge lamp circuit including the third discharge lamp, a voltage transmitting impedance coupled between said first AC source and said second discharge lamp circuit whereby energizing of the first AC source serves to start all of said lamps, and switch means for responding to the starting of the lamp in the second discharge lamp circuit to couple the second AC source to said second discharge lamp circuit.

2. A flickerless discharge lamp lighting apparatus comprising in combination, a first and a second discharge lamp, a first AC source for producing a voltage having a magnitude capable of starting the discharge lamps, a second AC source for producing a voltage having a magnitude less than that of the first AC source but capable of maintaining the constant lighting of the discharge lamps, means for coupling the first discharge lamp to the first AC source, a voltage transmitting impedance coupled between the first AC source and the second discharge lamp whereby energizing of the first AC source serves to start both of said lamps, and switch means interposed between the second AC source and the second discharge lamp for responding to the starting of the second discharge lamp to couple the second AC source to the second discharge lamp.

3. A flickerless discharge lamp lighting apparatus according to claim wherein the current in the second discharge lamp is delayed in phase, the means for coupling the first discharge lamp to the first AC source including means for advancing the phase of the current in the first discharge lamp.

4. A flickerless discharge lamp lighting apparatus according to claim 3 wherein the switch means comprises a silicon symmetrical switch.

5. A flickerless discharge lamp lighting apparatus according to claim 3 wherein said voltage transmitting impedance comprises a condenser.

6. A flickerless discharge lamp lighting apparatus according to claim 3 wherein the first AC source comprises a first leakage transformer having a primary and a secondary coupled to said primary, the second AC source comprising a second leakage transformer having a winding coupled to the primary of the first leakage transformer.

7. A flickerless discharge lamp lighting apparatus according to claim 6 wherein the first leakage transformer comprises a lead peak type leakage transformer whereby the effective value of the no load secondary voltage of the first transformer is reduced.

* * * * *